United States Patent
Takezawa et al.

(10) Patent No.: US 7,213,928 B2
(45) Date of Patent: May 8, 2007

(54) LIGHT SOURCE DEVICE AND PROJECTOR

(75) Inventors: Takeshi Takezawa, Matsumoto (JP); Shohei Fujisawa, Matsumoto (JP); Kazuhiro Tanaka, Matsumoto (JP); Hiroyuki Kobayashi, Matsumoto (JP); Toru Terashima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 291 days.

(21) Appl. No.: 11/042,507

(22) Filed: Jan. 26, 2005

(65) Prior Publication Data
US 2005/0213054 A1    Sep. 29, 2005

(30) Foreign Application Priority Data
Mar. 23, 2004  (JP)  ............................. 2004-085042
Apr. 21, 2004  (JP)  ............................. 2004-125768

(51) Int. Cl.
*G03B 21/28* (2006.01)
*F21V 7/00* (2006.01)
(52) U.S. Cl. ........................................ 353/99; 362/341
(58) Field of Classification Search ............ 353/98–99; 362/341, 344, 261, 263, 345
See application file for complete search history.

(56) References Cited

U.S. PATENT DOCUMENTS 7,059,746 B2 *  6/2006  Takezawa  ..................... 353/98

FOREIGN PATENT DOCUMENTS

JP       A 8-031382     2/1996
JP       A 11-353933    12/1999

\* cited by examiner

*Primary Examiner*—Christopher Mahoney
(74) *Attorney, Agent, or Firm*—Oliff & Berridge, PLC

(57) ABSTRACT

A light source device includes: a light source lamp that has a light-emitting portion and sealing sections provided on both sides of the light-emitting portion; a reflector that aligns and irradiates a light beam radiated by the light source lamp in a predetermined direction; and a sub-reflection mirror of which reflection surface opposes to a reflection surface of the reflector and reflects the light beam radiated by the light-emitting portion of the light source lamp toward the reflector. In the sub-reflection mirror, an adhesion surface of an insertion hole is bonded to the sealing section by an adhesive in a condition that the sealing section is inserted in the insertion hole. A cutting portion of the sub-reflection mirror is so formed to extend over a portion bonded by the adhesive in plan view.

20 Claims, 11 Drawing Sheets

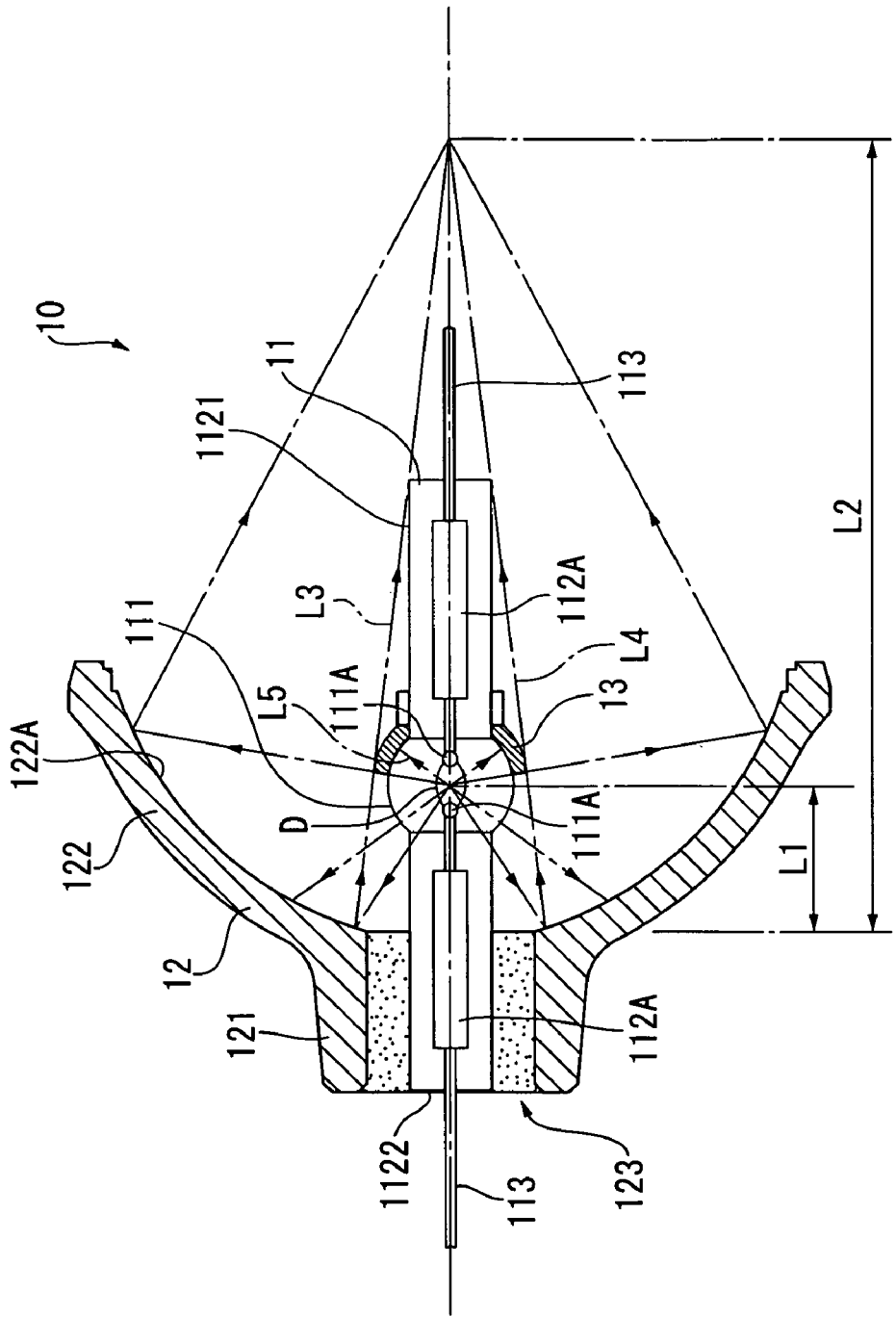

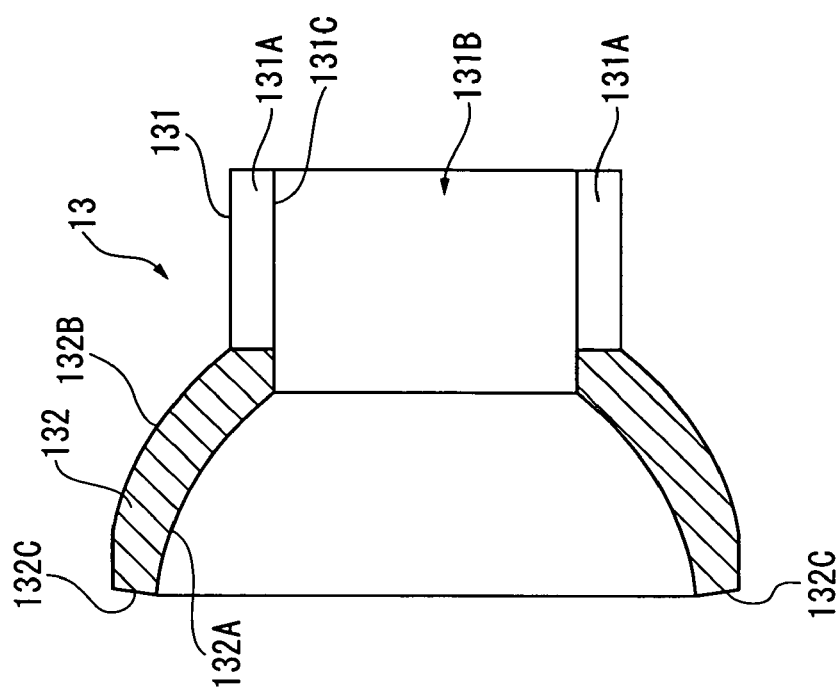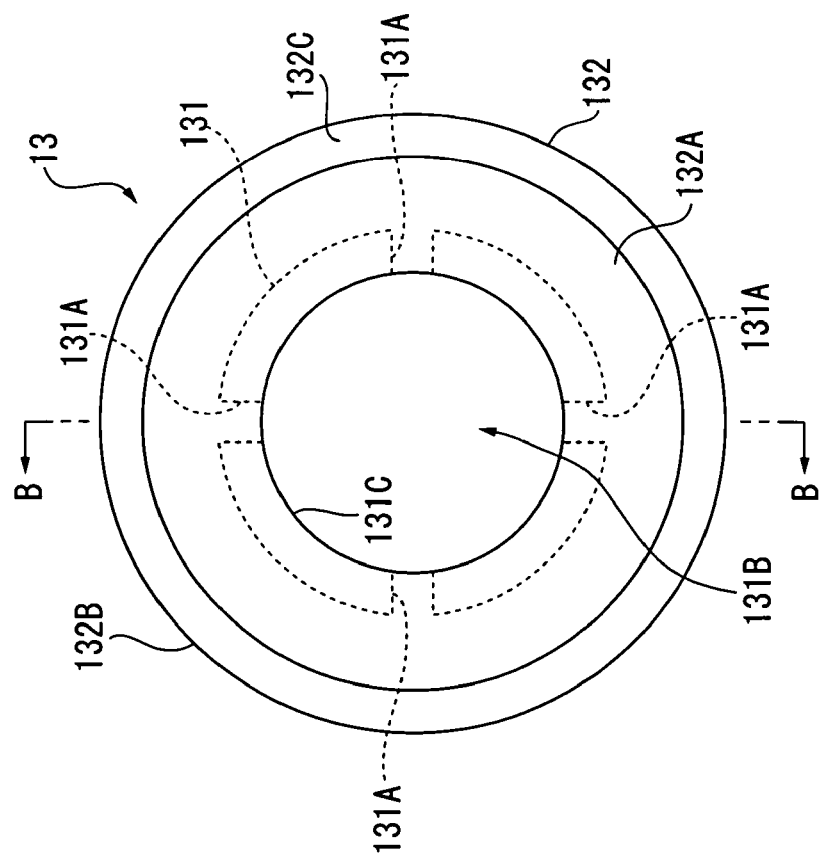

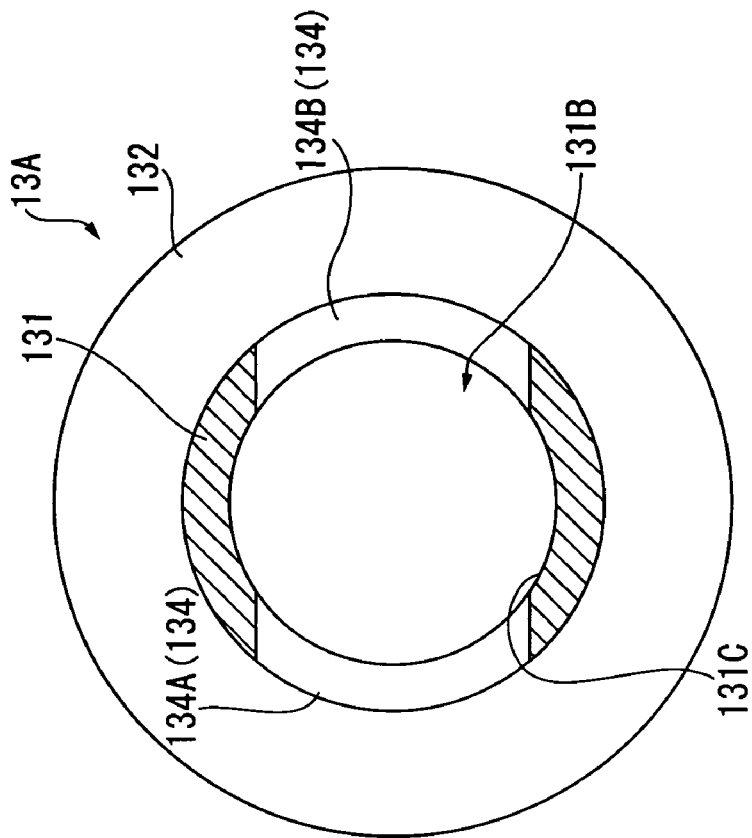
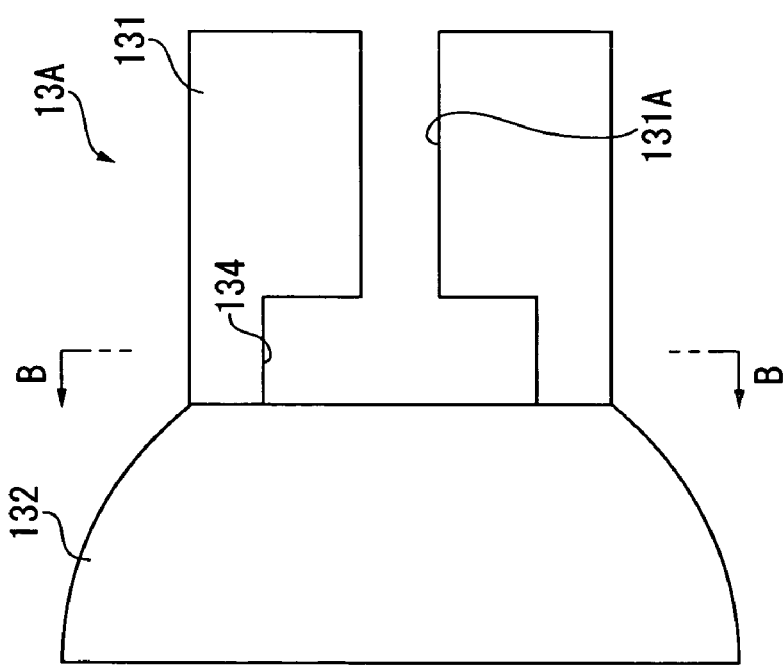

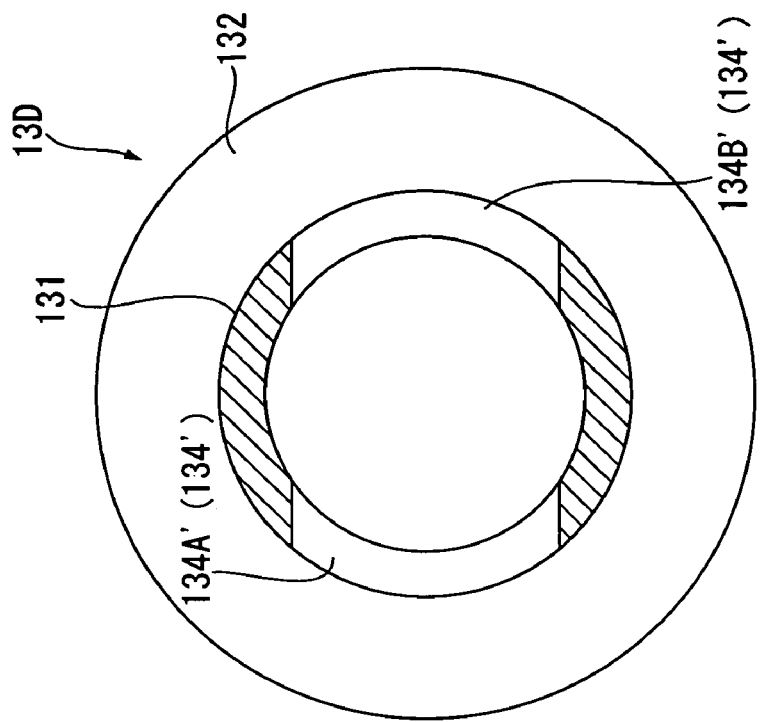
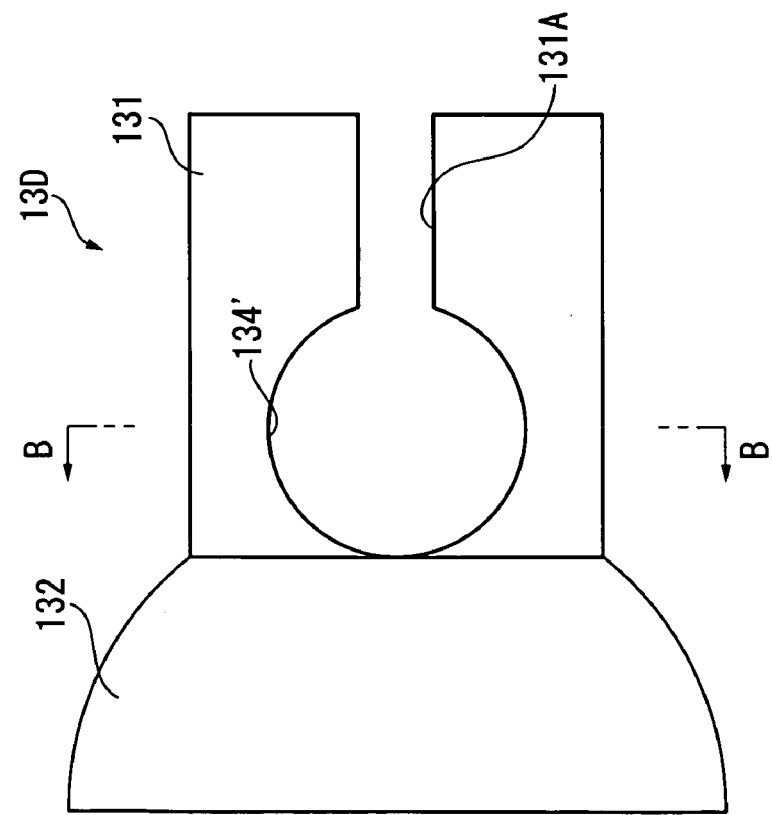

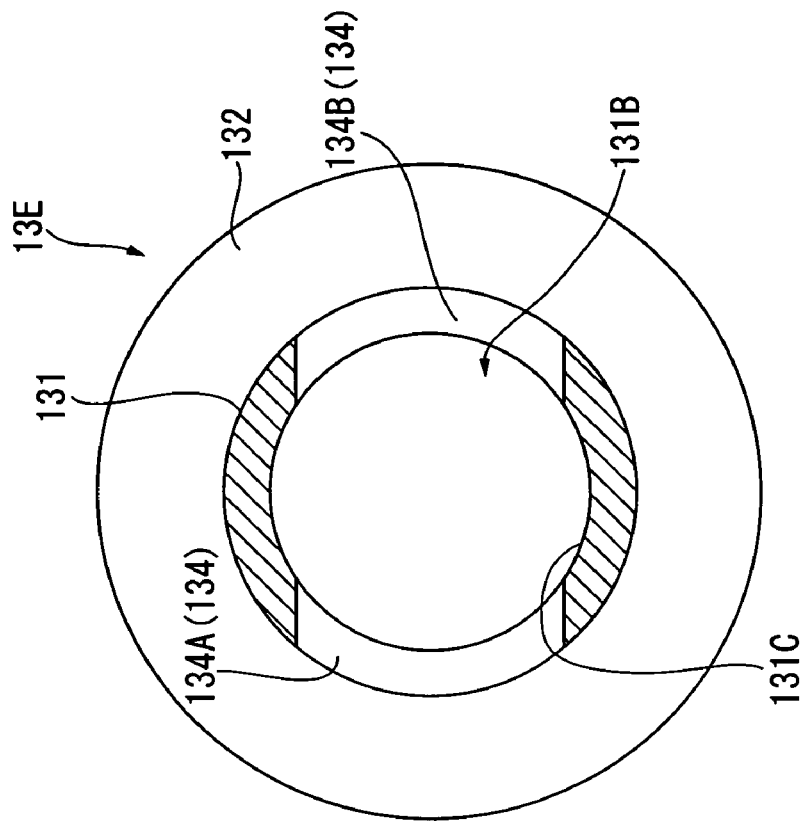
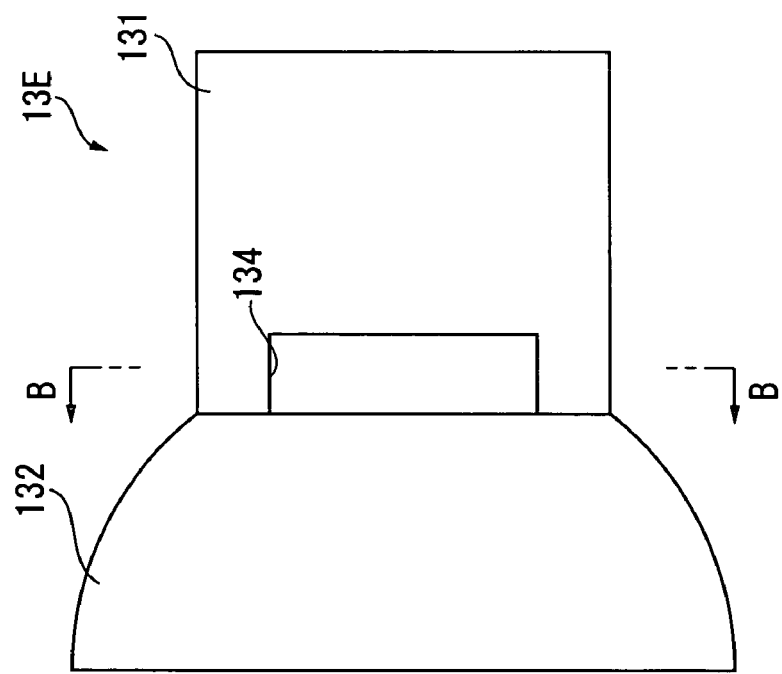

LIGHT SOURCE DEVICE AND PROJECTOR

BACKGROUND OF THE INVENTION

1. Field of the Invention

Exemplary aspects of the present invention relate to a light source device and a projector.

2. Description of Related Art

There is a related art projector that modulates a light beam irradiated by a light source in accordance with image information and projects the light beam in an enlarged manner. Such projector is used together with a personal computer for presentations at conferences or the like. In recent years, this type of projector is also used for home-theater purpose in response to increasing demand for watching movies etc. on a wide screen at home.

As a related art light source device of such projector, a discharge light source device such as a metal halide lamp and a high-pressure mercury lamp is used (see, for example, JP HEI 08-031382A).

This light source device is provided with: a discharge light-emitting tube that has a light-emitting portion for discharging electricity between electrodes to emit light, and sealing sections provided at both ends of the light-emitting portion; a first reflection mirror that aligns and projects light beams radiated from the discharge light-emitting tube in a predetermined direction; and a second reflection mirror bonded to the sealing section by cement and adapted to condense light beams irradiated from the discharge light-emitting tube and irradiate the light beams on the first reflection mirror.

In such light source device, the second reflection mirror efficiently condenses a light beam not in use contained in the light beams radiated from the light-emitting tube, thereby increasing the condensing efficiency.

According to the above-described light source device, however, when the temperature of the discharge light-emitting tube becomes high, the cement bonding the discharge light-emitting tube and the second reflection mirror is thermally expanded, so that a stress is applied to both of the discharge light-emitting tube and the second reflection mirror. This might be resulted in an explosion of the discharge light-emitting tube and a destruction of the second reflection mirror.

SUMMARY OF THE INVENTION

Exemplary aspects of present invention provide a light source device and a projector capable of reducing or preventing damage to a light-emitting tube and a sub-reflection mirror even in the case the sub-reflection mirror is bonded to the light-emitting tube by an adhesive.

A light source device according to an exemplary aspect of the present invention includes: a light-emitting tube having a light-emitting portion that discharges electricity between electrodes and emits a light beam, and sealing sections provided on both ends of the light-emitting portion; a reflector that aligns and irradiates the light beam radiated by the light-emitting tube in a predetermined direction; and a sub-reflection mirror of which reflection surface opposes to a reflection surface of the reflector and reflects the light beam radiated by the light-emitting portion of the light-emitting tube toward the reflector. The sub-reflection mirror has an insertion hole in which the sealing section is inserted and at least one cutting portion. An inner circumference of the insertion hole is bonded to the sealing section by an adhesive in a condition that the sealing section is inserted in the insertion hole. The at least one cutting portion and a portion bonded by the adhesive are at least partially overlapped.

The cutting portion may be formed to penetrate from the outer circumference to the inner circumference of the insertion hole, or it may be formed on either one of the inner circumference or the outer circumference without penetrating to the other surface.

According to the exemplary aspect of present invention, the inner circumference of the insertion hole is bonded to the outer circumference of the sealing section by the adhesive in a condition that the sealing section is inserted in the insertion hole, so that the sub-reflection mirror is attached to the light-emitting tube. Further, at least one cutting portion at least partially overlapping with the bonding portion is formed in the sub-reflection mirror. Accordingly, since the size in the circumferential direction of the insertion hole is changed by the at least one cutting portion even when the light-emitting tube is heated while the light source device is driven and therefore the adhesive between the light-emitting tube and the sub-reflection mirror thermally expands to cause stress in the direction to approach to the center axis of the insertion hole and in the direction to recede away from the center axis of the insertion hole, the stress by thermal expansion can be thus reduced. Therefore, even when the sub-reflection mirror is bonded to the light-emitting tube by the adhesive, the damage to the light-emitting tube and the sub-reflection mirror can be reduced or prevented, and the service life of the light source device can be extended.

In the light source device of an exemplary aspect of invention, the sub-reflection mirror may include: a neck section having the insertion hole and extending along the sealing section; and a reflection section connected to a base end side in the extending direction of the neck section and having the reflection surface. The at least one cutting portion is formed on the neck section.

With this arrangement of the exemplary aspect of the present invention, since the sub-reflection mirror has the neck section and the reflection section, the bonding area of the sub-reflection mirror for the light-emitting tube is wider than the one without the neck section, thereby improving a bonding state between the light-emitting tube and the sub-reflection mirror.

Also, since the neck section is bonded to the sealing section and at least one cutting portion is formed at the neck section, no cutting portion is formed in the reflection section, that is, no cutting portion is formed in the reflection surface. Therefore, the damage to the light-emitting tube and the sub-reflection mirror can be reduced or prevented, and the efficiency for the sub-reflection mirror to use the light of the light source device can be adequately maintained.

In the light source device of an exemplary aspect of the invention, the cutting portion may include a plurality of cutting portions formed on the sub-reflection mirror. The plurality of cutting portions are symmetrically located with respect to an axis passing a center of the insertion hole.

According to this configuration of the exemplary aspect of the present invention, since the plurality of cutting portions are formed in the sub-reflection mirror, the stress by the adhesive can be reduced comparing with the configuration having only one cutting portion, thereby reducing or preventing the damage to the light-emitting tube and the sub-reflection mirror.

Since the plurality of the cutting portions are symmetrically located with respect to an axis passing the center of the insertion hole, the stress by the adhesive can be dispersed, and therefore the damage to the light-emitting tube and the sub-reflection mirror can be efficiently reduced or prevented.

A light source device according to another exemplary aspect of the present invention includes: a light-emitting tube having a light-emitting portion that discharges electricity between electrodes and emits a light beam, and sealing sections provided on both ends of the light-emitting portion; a reflector that aligns and irradiates the light beam radiated by the light-emitting tube in a predetermined direction; and a sub-reflection mirror of which reflection surface opposes to a reflection surface of the reflector and reflects the light beam radiated by the light-emitting portion of the light-emitting tube toward the reflector. The sub-reflection mirror has: a neck section having an insertion hole in which the sealing section is inserted and of which inner circumference is bonded to the sealing section by an adhesive, the neck section extending along the sealing section; and a reflection section connected to a base end side in the extending direction of the neck section and having the reflection surface. At least one opening penetrating from an outer circumference of the neck section to the inner circumference of the insertion hole is formed on the neck section. The opening is closer to the base end side in the extending direction of the neck section than the portion bonded by the adhesive.

According to the exemplary aspect of the present invention, the inner circumference of the insertion hole is bonded to the outer circumference of the sealing section by the adhesive in a condition that the sealing section is inserted in the insertion hole of the neck section, so that the sub-reflection mirror is attached to the light-emitting tube. Also, on the neck section, at least one opening penetrating from the outer circumference of the neck section to the inner circumference of the insertion hole is formed at a position closer to the base end side in the extending direction of the neck section than the bonding portion. With this configuration of the exemplary aspect of the present invention, when the temperature of the light-emitting tube becomes high while the light source device is driven, the heat staying in the clearance between the light-emitting tube and the neck section of the sub-reflection mirror can be discharged to the outside through the opening. This suppresses the temperature rise of the connecting portion between the light-emitting tube and the sub-reflection mirror. Therefore, the thermal expansion of the adhesive between the light-emitting tube and the sub-reflection mirror is reduced. Further, even when the sub-reflection mirror is bonded to the light-emitting tube by the adhesive, the damage to the light-emitting tube and the sub-reflection mirror can be reduced or prevented, and the service life of the light source device can be extended.

Since the sub-reflection mirror has the neck section and the reflection section, the bonding area of the sub-reflection mirror for the light-emitting tube is wider than the one without the neck section, thereby improving a bonding state between the light-emitting tube and the sub-reflection mirror.

In the light source device of an exemplary aspect of invention, when a lower side is defined as a side on which the weight of the light source device is applied and an upper side is defined as a side opposite to the side on which the weight is applied, the opening may be formed on the upper side on the neck section.

According to this configuration of the exemplary aspect of invention, since the opening is formed on the upper side on the neck section, the opening is located in the convection direction of the air heated by the heat. Therefore, the air heated by the light-emitting tube and staying in the clearance between the light-emitting tube and the sub-reflection mirror can be smoothly discharged to the outside through the opening. This effectively suppresses the temperature rise of the connecting portion between the light-emitting tube and the sub-reflection mirror.

In the light source device of an exemplary aspect of invention, the openings may be formed on both of the upper side and the lower side on the neck section.

According to this configuration of the exemplary aspect of invention, since the openings are formed on both of the upper side and the lower side on the neck section, the natural convection of the air between the clearance between the light-emitting tube and the sub-reflection mirror and the outside of the sub-reflection mirror is easily caused. That is, the outside air easily flows into the clearance between the light-emitting tube and the sub-reflection mirror through the opening formed on the lower side, and the air in the clearance between the light-emitting tube and the sub-reflection mirror can be easily discharged to the outside through the opening formed on the upper side. Therefore, the air heated by the light-emitting tube and staying in the clearance between the light-emitting tube and the sub-reflection mirror can be smoothly discharged to the outside, while the cooling air flows into the clearance between the light-emitting tube and the sub-reflection mirror. Accordingly, the temperature rise of the connecting portion between the light-emitting tube and the sub-reflection mirror can be effectively suppressed.

In the light source device of an exemplary aspect of invention, at least one cutting portion at least partially overlapping with the portion bonded by the adhesive may be formed on the neck section.

The cutting portion may be formed to penetrate from the outer circumference to the inner circumference of the insertion hole, or it may be formed on either one of the inner circumference or the outer circumference without penetrating to the other surface.

According to this configuration of the exemplary aspect of invention, since at least one cutting portion at least partially overlapping with the bonding portion is formed on the neck section, the size in the circumferential direction of the insertion hole is changed by the at least one cutting portion even when the adhesive between the light-emitting tube and the sub-reflection mirror thermally expands to cause stress in the direction to approach to the center axis of the insertion hole and in the direction to recede away from the center axis of the insertion hole. The stress by the adhesive can be thus reduced.

Therefore, the damage to the light-emitting tube and the sub-reflection mirror can be effectively reduced or prevented due to the effect of the cutting portion for reducing the stress of the adhesive in addition to the effect of the openings for releasing the heat of the connecting portion between the light-emitting tube and the sub-reflection mirror.

In the light source device of an exemplary aspect of invention, the width of the opening in a direction orthogonal to the extending direction of the neck section may be greater than the width of the cutting portion in the direction orthogonal to the extending direction of the neck section, and the opening and the cutting portion are connected with each other.

According to this configuration of the exemplary aspect of invention, since the width of the opening is greater than the width of the cutting portion, and the opening and the cutting portion are connected with each other, the opening as well as the cutting portion serve to reduce the stress of the above-described adhesive. This allows larger size change of the insertion hole in the circumferential direction, and therefore the damage to light-emitting tube and the sub-reflection mirror can be effectively reduced or prevented even when the thermal expansion of the adhesive is large.

A projector according to a further exemplary aspect of the present invention, includes: any one of the above-described light source devices; an optical modulator that modulates a light beam irradiated by the light source device in accordance with image information; and a projection optical device that enlarges and projects the light beam modulated by the optical modulator.

With this arrangement of the exemplary aspect of invention, since the projector has the above-described light source device, the optical modulator and the projection optical device, the same functions and advantages as the above-described light source device can be obtained.

Since the projector has the light source device capable of reducing or preventing the damage to the light-emitting tube and the sub-reflection mirror, the service life of the projector can be extended, and the replacement work of the light source device can be reduced.

BRIEF DESCRIPTION OF THE DRAWINGS

FIG. 2 is a schematic cross section showing the structure of the light source device according to a first exemplary embodiment;

FIGS. 3A and 3B are schematic illustrations each showing a sub-reflection mirror according to the aforesaid exemplary embodiment;

FIGS. 6A and 6B are schematic illustrations each showing a sub-reflection mirror according to a second exemplary embodiment;

FIGS. 10A and 10B are schematic illustrations each showing a modification of the second exemplary embodiment; and FIGS. 11A and 11B are schematic illustrations each showing another modification of the second exemplary embodiment.

DETAILED DESCRIPTION OF EXEMPLARY EMBODIMENT(S)

1 First Embodiment

A first exemplary embodiment of the present invention will be described below with reference to the attached drawings.

Structure of Projector

Figure 1:
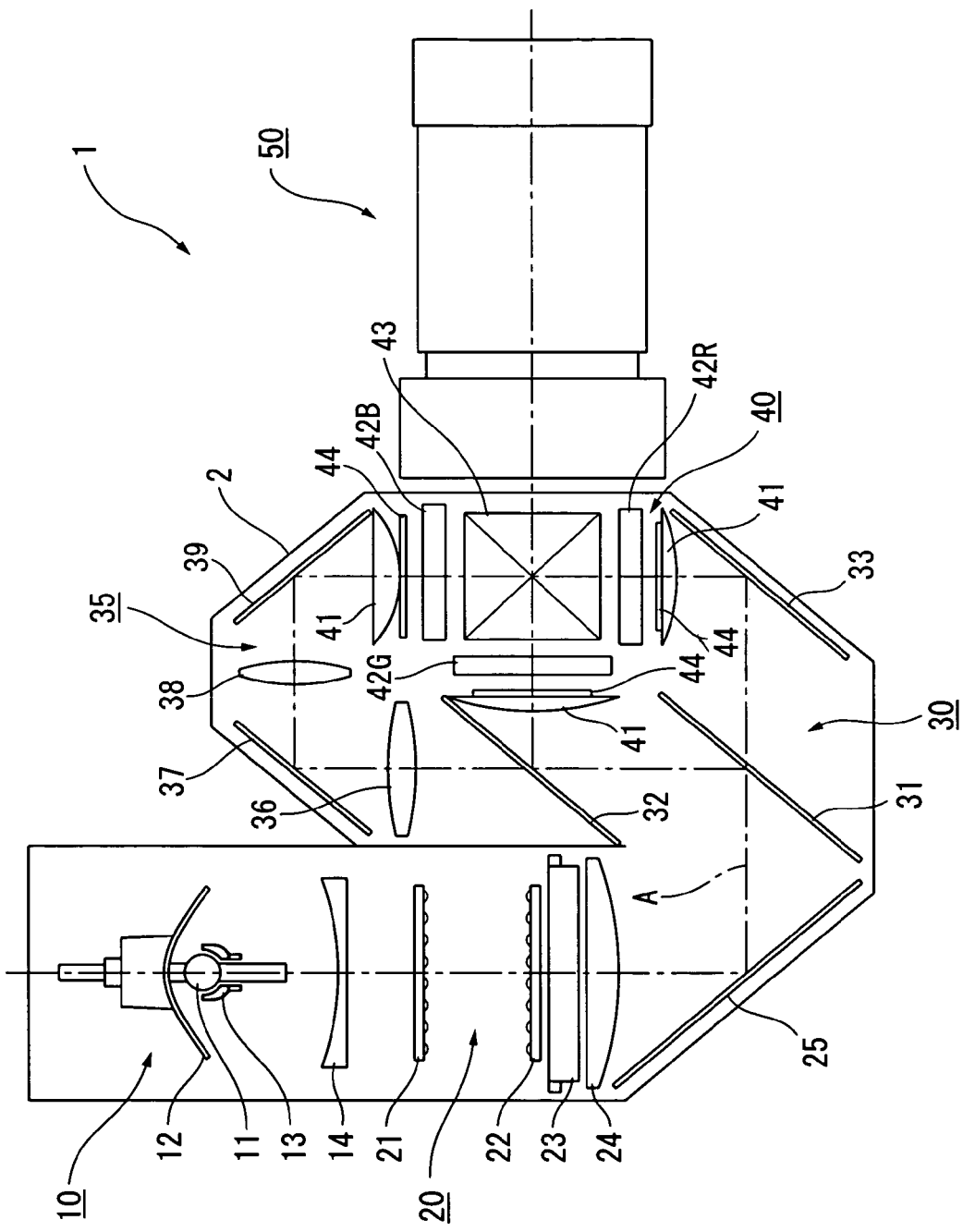
FIG. 1 is a schematic illustration showing an optical equipment of a projector equipped with a light source device according to the present exemplary embodiments.

FIG. 1 is a schematic illustration showing an optical equipment of a projector 1 equipped with a light source device according to an exemplary embodiment of the present invention.

The projector 1 is an optical equipment that modulates a light beam irradiated by a light source in accordance with image information to form an optical image, and projects the optical image on a screen in an enlarged manner.

As shown in FIG. 1, the projector 1 includes a light source device 10, an integrator illumination optical system 20, a color-separating optical system 30, a relay optical system 35, an optical device 40 and a projection optical system 50 as a projection optical device. Optical elements of these optical systems 20 to 35 and the optical device 40 are positioned and housed in an optical component casing 2 in which a predetermined illumination optical axis A is set.

The light source device 10 aligns and irradiates a light beam radiated from a light source lamp 11 in a predetermined direction to illuminate the optical device 40. The light source device 10, which will be described later in detail, includes the light source lamp 11, an ellipsoidal reflector 12, a sub-reflection mirror 13 and a not-shown lamp housing supporting theses components. On the downstream of a light-irradiation direction of the ellipsoidal reflector 12, a parallelizing concave lens 14 is provided. The parallelizing concave lens 14 may be integrally formed with the light source device 10 or may be provided separately.

The light beam emitted by the light source lamp 11 is irradiated toward the front side of the light source device 10 as a convergent light after the irradiating direction thereof is aligned by the ellipsoidal reflector 12. The convergent light is then parallelized by the parallelizing concave lens 14 and irradiated on the integrator illumination optical system 20.

The integrator illumination optical system 20 is an optical system that splits the light beam irradiated by the light source device 10 into a plurality of sub-beams to equalize the in-plane luminance of an illumination area. The integrator illumination optical system 20 has a first lens array 21, a second lens array 22, a polarization converter 23, a superposing lens 24 and a reflection mirror 25.

The first lens array 21 is a light-beam splitting optical element for splitting the light beam irradiated by the light source device 10 into a plurality of sub-beams, and is provided with a plurality of small lenses arranged in a matrix in a plane orthogonal to the illumination optical axis A.

The second lens array 22 is an optical element for condensing the plurality of sub-beams split by the first lens array 21, and is provided with a plurality of small lenses arranged in a matrix in a plane orthogonal to the illumination optical axis A in the same manner as the first lens array 21.

The polarization converter 23 is a polarization-converting element for aligning the polarization direction of the respective sub-beams split by the first lens array 21 to have the beams linearly polarized in substantially single direction.

Though not illustrated, the polarization converter 23 has a configuration in which polarization separating films and reflection films inclined relative to the illumination optical axis A are alternately arranged. The polarization separating film transmits either one of P polarized light beam or S polarized light beam contained in the respective sub-beams and reflects the other one of the polarized light beams. The reflected polarized light beam is refracted by the reflection film and is irradiated in the irradiation direction of the transmitted polarized light beam, i.e., the direction along the illumination optical axis A. Either one of the irradiated polarized light beams is polarization-converted by a phase plate provided on the light-irradiation surface of the polarization converter 23 so that the polarization direction of substantially all of the polarized light beams are aligned. With the use of the polarization converter 23, the light beam irradiated by the light source lamp 11 can be aligned as a light beam polarized in substantially single direction, thereby enhancing the utilization ratio of the light source beam used in the optical device 40.

The superposing lens 24 is an optical element for condensing the plurality of sub-beams having passed through the first lens array 21, the second lens array 22 and the polarization converter 23 to superpose the sub-beams on an image formation area of later-described three liquid crystal panels of the optical device 40.

The light beam irradiated by the superposing lens 24 is refracted by the reflection mirror 25 to be irradiated to the color-separating optical system 30.

The color-separating optical system 30 includes two dichroic mirrors 31 and 32 and a reflection mirror 33, and separates the plurality of sub-beams irradiated from the integrator illumination optical system 20 by the dichroic mirrors 31 and 32 into three color lights of red (R), green (G) and blue (B).

The dichroic mirrors 31 and 32 are optical elements having a substrate on which a wavelength-selection film that reflects a light beam of a predetermined wavelength and transmits a light beam of the other wavelength is formed. The dichroic mirror 31 disposed on the upstream of the optical path is a mirror that transmits the red light and reflects the other color lights. The dichroic mirror 32 disposed on the downstream of the optical path is a mirror that reflects the green light and transmits the blue light.

The relay optical system 35 has an incident-side lens 36, a relay lens 38 and reflection mirrors 37 and 39, and guides the blue light transmitted through the dichroic mirror 32 of the color-separating optical system 30 to the optical device 40. Herein, because the optical path length of the blue light is longer than those of the other color lights, the relay optical system 35 is used for the optical path of the blue light, thereby preventing deterioration in the light utilization efficiency caused by the light dispersion and the like. This exemplary embodiment adopts such arrangement since the optical path of the blue light is long. However, the optical path of the red light may alternatively be lengthened so that the relay optical system 35 is used for the optical path of the red light.

The red light separated by the above-described dichroic mirror 31 is refracted by the reflection mirror 33, and then supplied to the optical device 40 through a field lens 41. The green light separated by the dichroic mirror 32 is directly supplied to the optical device 40 through the field lens 41. The blue light is condensed and refracted by the lenses 36, 38 and the reflection mirrors 37, 39 of the relay optical system 35, and then supplied to the optical device 40 through the field lens 41. Incidentally, the field lenses 41 provided on the upstream of the optical path of the respective color lights of the optical device 40 are provided for converting the respective sub-beams irradiated by the second lens array 22 into light beams parallel to the illumination optical axis.

The optical device 40 modulates the incident light beam in accordance with image information to form a color image. The optical device 40 includes liquid crystal panels 42R, 42G and 42B (defining liquid crystal panel at the red light side as 42R, liquid crystal panel at the green light side as 42G, and the liquid crystal panel at the blue light side as 42B) as an optical modulator to be illuminated and a cross dichroic prism 43. Incidentally, incident-side polarization plates 44 are interposed between the field lenses 41 and the respective liquid crystal panels 42R, 42G and 42B and, though not illustrated, irradiation-side polarization plates are interposed between the respective liquid crystal panels 42R, 42G and 42B and a cross dichroic prism 43, so that the incident-side polarization plates 44, the liquid crystal panels 42R, 42G and 42B and the irradiation-side polarization plates modulate the respective incident color lights.

Each of the liquid crystal panels 42R, 42G and 42B is a pair of light-transmissive glass substrates with liquid crystal (electrooptic material) sealed therebetween, which modulates the polarization direction of the polarized light beam irradiated by the incident-side polarization plates 44 in accordance with given image signal using, for instance, polycrystalline silicon TFT as a switching element.

The cross dichroic prism 43 is an optical element for combining the optical images irradiated by the irradiation-side polarization plates and modulated for each color light to form a color image. The cross dichroic prism 43 has a square profile in plan view with four right-angle prisms adhered with each other, and dielectric multi-layered films are formed on adhesion surfaces between the respective right-angle prisms. One of the multi-layered films arranged in approximately X-shape reflects the red light and the other multi-layer film reflects the blue light. The multi-layered films refract the red light and the blue light to be aligned with the advancing direction of the green light, thereby combining the three color lights.

The color image irradiated by the cross dichroic prism 43 is projected by the projection optical system 50 in an enlarged manner to form a large image on a screen (not shown).

Structure of Light Source Device

FIG. 2 is a schematic cross section showing the structure of the light source device 10.

In the light source device 10, as shown in FIG. 2, the sub-reflection mirror 13 is attached to the light source lamp 11 as a light-emitting tube. The light source lamp 11 and the sub-reflection mirror 13 are arranged inside the ellipsoidal reflector 12.

As shown in FIG. 2, the light source lamp 11 is a silica glass tube with a spherical center part, and is provided with a light-emitting portion 111 at the center portion, a sealing section 1121 and another sealing section 1122 extending on both sides of the light-emitting portion 111.

Various light-emitting tubes for emitting light with high luminance may be used as the light source lamp 11, which may be metal halide lamp, high-pressure mercury lamp, extra high-pressure mercury lamp or the like.

A pair of tungsten electrodes 111A with a predetermined distance inbetween, mercury, rare gas and small portion of halogen are sealed inside the light-emitting portion 111.

Metal foils 112A made of molybdenum electrically connected with the electrodes of the light-emitting portion 111 are inserted in the sealing section 1121 and the sealing section 1122 extending on both sides of the light-emitting portion 111, and are sealed by glass material etc. A lead wire 113 (electrode-connecting wire) is connected to the metal foils 112A, the lead wire 113 extending toward the outside of the light source lamp 11.

When a predetermined voltage is applied to the lead wire 113, as shown in FIG. 2, voltage potential difference is caused between the electrodes 111A through the metal foils 112A and the electricity is thus discharged, so that an arc image D is generated and the light-emitting portion 111 emits light.

If the outer circumference of the light-emitting portion 111 is covered by a multilayer antireflection coat containing a tantalum oxide film, a hafnium oxide film, a titanium oxide film or the like, light loss due to the reflection of the light passing therethrough can be reduced.

As shown in FIG. 2, the ellipsoidal reflector 12 is a glass molding integrally having a neck section 121 to which the sealing section 1122 at the base end side of the light source lamp 11 is inserted and a reflection section 122 of ellipsoidal surface extending from the neck section 121.

An insertion hole 123 is formed at the center of the neck section 121, and the sealing section 1122 is disposed at the center of the insertion hole 123.

The reflection section 122 includes a reflection surface 122A, which is an ellipsoid of revolution glass surface with a metal thin film evaporated thereon. The reflection surface 122A of the reflection section 122 is a cold mirror reflecting visible light and transmitting infrared ray.

The light source lamp 11 is disposed inside the reflection section 122 of the ellipsoidal reflector 12 so that the light-emitting center between the electrodes 11A inside the light-emitting portion 111 is positioned in the vicinity of a first focal point position L1 of the ellipsoid of revolution surface of the reflection surface 122A of the reflection section 122.

When the light source lamp 11 is lit, the light beam radiated by the light-emitting portion 111 is reflected by the reflection surface 122A of the reflection section 122 to be a convergent light converging at a second focal point position L2 of the ellipsoid of revolution surface of the reflection section 122.

In such condition, the area inside the boundary lines L3 and L4 connecting the second focal point position L2 and the end of the sealing section 1121 at the front side in the light-irradiating direction of the light source lamp 11 is a light-beam non-available area, because the light beam reflected by the ellipsoidal reflector 12 is shielded by the sealing section 1121 without reaching the second focal point position L2.

FIGS. 3A and 3B are schematic illustrations each showing the structure of the sub-reflection mirror 13. Specifically, FIG. 3A is a front view of the sub-reflection mirror 13 seen from the light-incident side thereof. FIG. 3B is a cross section taken along a line B—B in FIG. 3A.

Figure 4:
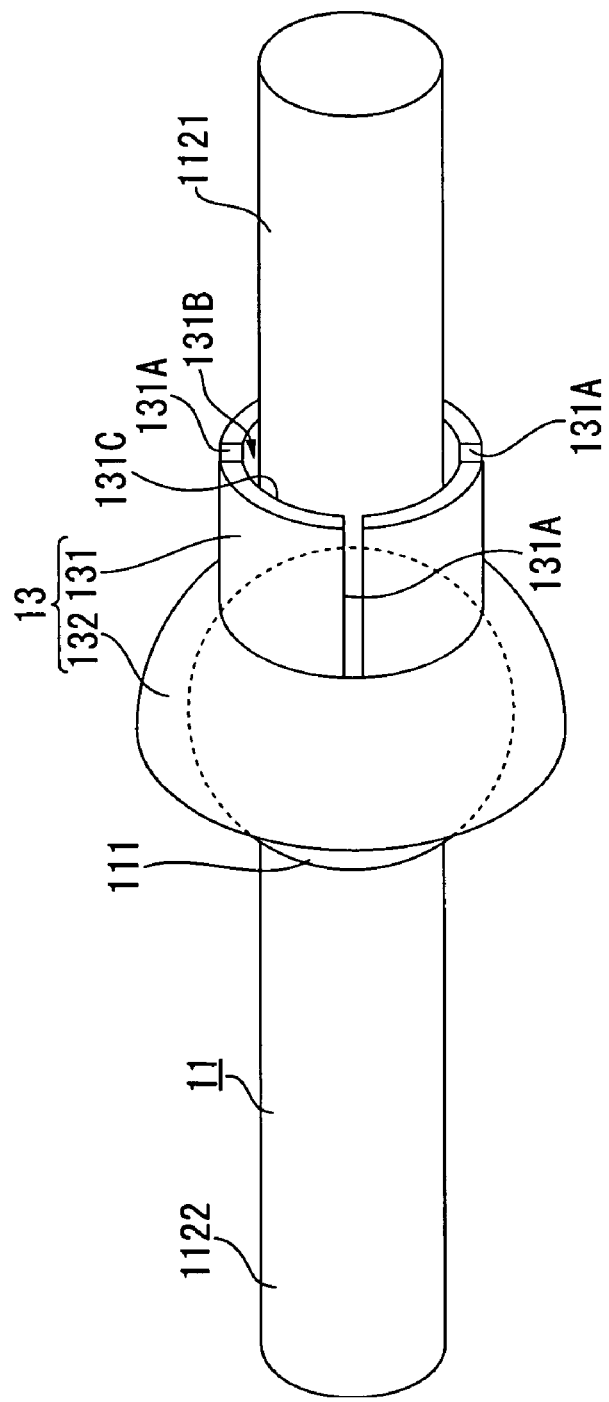
FIG. 4 is a schematic showing how the sub-reflection mirror is arranged with respect to a light source lamp according to the aforesaid exemplary embodiment.

FIG. 4 is a schematic showing how the sub-reflection mirror 13 is arranged with respect to the light source lamp 11.

As shown in FIGS. 3A, 3B and 4, the sub-reflection mirror 13 with the substantially same shape as the ellipsoidal reflector 12 has a neck section 131 with a substantially cylindrical shape to which the sealing section 1121 at the front end side of the light source lamp 11 is inserted and a substantially spherical reflection section 132 extending from the neck section 131 so that the neck section 131 and the reflection section 132 are integrally formed.

The neck section 131 is a portion for bonding the sub-reflection mirror 13 to the light source lamp 11.

As shown in FIGS. 3A, 3B and 4, the neck section 131 has four cutting portions 131A symmetrically located with respect to a cylindrical shaft. Each of the cutting portions 131A is extended from the front end side to the base end side connected to the reflection section 132.

On the neck section 131, the sealing section 1121 of the front end side of the light source lamp 11 is inserted in a cylindrical insertion hole 131B, so that the sub-reflection mirror 13 is set on the light source lamp 11 as shown in FIG. 4. The inner circumference of the insertion hole 131B, as will be described later, is an adhesion surface 131C on which a fixing adhesive 133 is filled to be fixed to the sealing section 1122.

As shown in FIG. 4, the bowl-shaped reflection section 132 is a reflection member that substantially covers the front half side of the light-emitting portion 111 of the light source lamp 11 when the sub-reflection mirror 13 is set on the light source lamp 11.

As shown in FIGS. 3A and 3B, the reflection section 132 has an inner surface as a reflection surface 132A formed to be spherical along the spherical surface of the light-emitting portion 111 of the light source lamp 11, and an outer circumference 132B curved according to the curvature of the reflection surface 132A. Although not shown in FIGS. 3A and 3B, the reflection surface 132A has a reflection film formed by evaporating metal. This reflection surface, like the reflection surface 122A of the ellipsoidal reflector 12, is a cold mirror reflecting visible light and transmitting infrared ray and ultraviolet ray.

In the reflection section 132, as shown in FIG. 3B, an end face at the front side extending from the neck section 131 is a slanted surface 132C so formed that the height of the bowl is gradually lowered from the end side of the reflection surface 132A (left end in FIG. 3B) toward the end side of the outer circumference 132B.

For shortening the length of the ellipsoidal reflector 12 in the direction of the optical axis A, an angle $\theta$ is preferably 105° or less.

Although the slanted surface is slanted along the angle $\theta$ in the present exemplary embodiment, the slanted surface 132C may be orthogonal to the optical axis A if the shielding amount of the radial light in the $\theta$ direction is small.

The above-mentioned sub-reflection mirror 13 is a material with low thermal expansivity and/or high thermal conductivity. For example, the sub-reflection mirror 13 is made of an inorganic material such as quartz and alumina ceramics.

By attaching the sub-reflection mirror 13 to the light source lamp 11, as shown in FIG. 2, a light beam L5, which is contained in the light beam radiated from the light-emitting portion 111 and is radiated to the opposite side of the ellipsoidal reflector 12 (the front side), is reflected by the reflection surface 132A of the sub-reflection mirror 13 toward the ellipsoidal reflector 12, and further reflected by the reflection surface 122A of the ellipsoidal reflector 12, and then irradiated from the reflection section 122 of the ellipsoidal reflector 12 to be converged toward a second focal point F2 position.

With the use of such sub-reflection mirror 13 as previously mentioned, the light beam radiated from the light-emitting portion 111 to the opposite side of the ellipsoidal reflector 12 (the front side) can be converged on the second focal point F2 position of the ellipsoidal reflector 12 in the same manner as the light beam directly incident from the light source lamp 11 onto the reflection surface 122A of the ellipsoidal reflector 12.

In a conventional light source device without the sub-reflection mirror 13, it is required to converge the light beam irradiated from the light source lamp 11 on the second focal point F2 position only by the ellipsoidal reflector, and therefore the opening of the ellipsoidal reflector must be wide.

However, with the sub-reflection mirror 13, since the light beam radiated from the light source lamp 11 to the opposite side of the ellipsoidal reflector 12 (the front side) can be reflected to the rear side by the sub-reflection mirror 13 so that the light beam is incident on the reflection surface 122A of the ellipsoidal reflector 12, almost all the light beams irradiated from the light-emitting portion 111 can be irradiated to be converged on a predetermined position even if the reflection section 122 is small. Accordingly, the size in the optical axis direction and the diameter of the opening of the ellipsoidal reflector 12 can be reduced. That is, the size of the light source device 10 and the projector 1 can be reduced, and therefore the light source device 10 may be easily incorporated in the projector 1.

Further, since the sub-reflection mirror 13 is provided, even if a first focal point F1 and the second focal point F2 of the ellipsoidal reflector 12 are located closer to each other to reduce the diameter of the light-condensing spot on the second focal point F2, almost all the light radiated from the light-emitting portion 111 is converged by the ellipsoidal reflector 12 and the sub-reflection mirror 13 onto the second focal point and can be utilized, therefore considerably enhancing the light utilization efficiency. Accordingly, a light source lamp 11 with a relatively low output can be employed, and also the light source lamp 11 and the light source device 10 can be kept at lower temperature.

Available marginal lights L3 and L4 as boundary lines between an available area and the non-available area are lights, which are contained in the light irradiated from the light-emitting portion 111 to the ellipsoidal reflector 12, corresponding to inner boundaries of the area that can be actually utilized as an illumination light. The available marginal lights L3 and L4 are determined by the configuration of the light source lamp 11, or otherwise determined by the configuration of the ellipsoidal reflector 12. The available marginal light determined by the configuration of the light source lamp 11 is an effective light, which is contained in the light irradiated from the light-emitting portion 111 toward the ellipsoidal reflector 12 (i.e. the rear side of the light source device 10), on the boundary with the light shielded by the sealing section 1122 and the like. The available marginal light determined by the configuration of the ellipsoidal reflector 12 is an effective light, which is contained in the light irradiated as the effective light from the light-emitting portion 111 toward the ellipsoidal reflector 12 (i.e. the rear side of the light source device 10) without being shielded by the sealing section 1122 and the like, on the boundary with a light that can not be reflected by the reflection surface 122A due to the ellipsoidal reflector 12 such as the presence of the insertion hole 123 of the ellipsoidal reflector 12 and therefore can not be utilized as illumination light. Accordingly, an inner area of a circular cone formed by the available marginal lights L3 and L4 is a light-beam non-available area. In the case the available marginal light is determined by the configuration of the light source lamp 11, almost all the lights irradiated from the light-emitting portion 111 to the rear side of the light source device 10 can be utilized according to the present exemplary embodiment.

When the outer circumference 132B of the sub-reflection mirror 13 is extended out of the circular cone formed by the available marginal lights L3 and L4, the light advancing forward after being reflected by the ellipsoidal reflector 12 is shielded, therefore lowering the light utilization efficiency. Accordingly, for preventing the light utilization ratio from lowering, it is preferable to make the outer circumference 132B of the sub-reflection mirror 13 as small as possible.

Next, a method for fixing the sub-reflection mirror 13 and the ellipsoidal reflector 12 to the light source lamp 11 will be descried below.

Figure 5A:
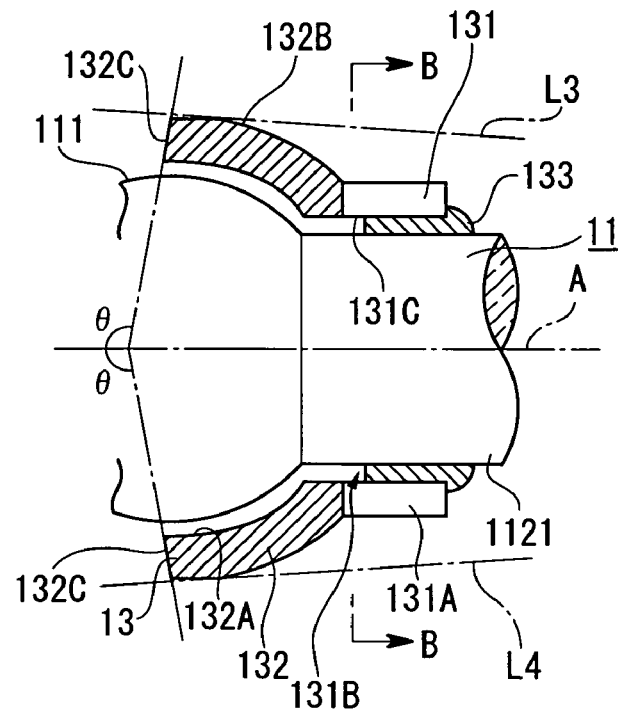
FIGS. 5A and 5B are schematic illustrations each showing how to fix the sub-reflection mirror to the light source lamp according to the aforesaid exemplary embodiment.
Figure 5B:
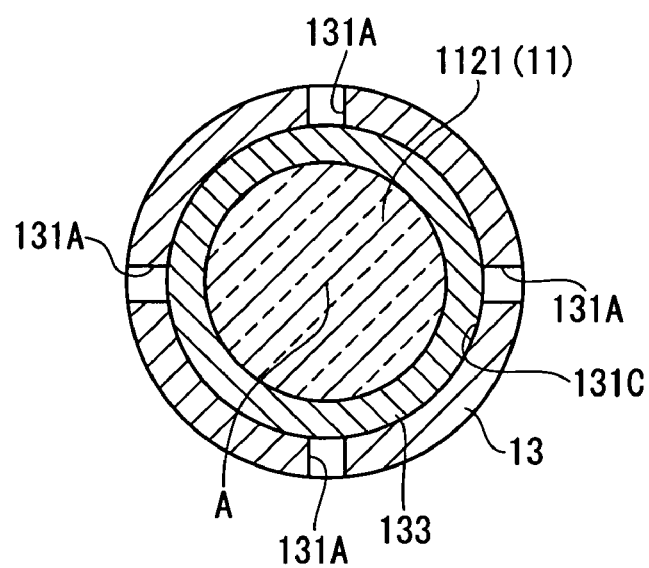

FIGS. 5A and 5B are illustrations each showing how to fix the sub-reflection mirror 13 to the light source lamp 11. Specifically, FIG. 5A is a cross section of the light source lamp 11 and the sub-reflection mirror 13 seen from the lateral side thereof. FIG. 5B is a cross section taken along a line B—B in FIG. 5A.

The above-described sub-reflection mirror 13 is attached to the light source lamp 11 as follows.

Firstly, the sub-reflection mirror 13 is located on the light source lamp 11 so that an incident light irradiated between a pair of the electrodes 111A of the light-emitting portion 111 to be incident on the sub-reflection mirror 13 matches a normal line of the reflection surface 132A of the sub-reflection mirror 13.

Then, as shown in FIG. 5A, the sub-reflection mirror 13 is positioned at a position in the direction orthogonal to the optical axis A with respect to the light source lamp 11 so that the slanted surface 132C is arranged along the angle θ formed by the base end portion of the light-irradiating direction of the illumination optical axis A of the ellipsoidal reflector 12 and the light beam radiated by the light-emitting portion 111 as well as so that the outer circumference 132B of the sub-reflection mirror 13 is located inside the circular cone formed by the above-described available marginal lights L3 and L4.

After positioning the sub-reflection mirror 13 at a predetermined position with respect to the light source lamp 11, as shown in FIGS. 5A and 5B, the adhesive 133 is filled throughout the circumference around the optical axis A between the adhesion surface 131C of the neck section 131 and the outer circumference of the sealing section 1121 of the light source lamp 11, so that the sub-reflection mirror 13 is adhered and fixed to the light source lamp 11. In this step, as shown in FIGS. 5A and 5B, the cutting portions 131A of the neck section 131 are arranged to extend over the adhesion portion of the adhesive 133.

As for the material of the adhesive 133, an inorganic adhesive of silica/alumina group is applicable. Glass fusion may also be applicable for the adhesion between the sub-reflection mirror 13 and the light-source lamp 11.

Next, a method for fixing the light source lamp 11 to the ellipsoidal reflector 12 will be descried.

When the light source lamp 11 is fixed to the above-described ellipsoidal reflector 12, the sealing section 1122 of the light source lamp 11 is inserted to the insertion hole 123 of the ellipsoidal reflector 12 so that the light-emitting center between the electrodes 111A in the light-emitting portion 111 is located at the first focal point position L1 of the ellipsoid of revolution surface of the reflection surface 122A of the reflection section 122, and an inorganic adhesive made mainly of silica and alumina is filled in the insertion hole 123.

The dimension of the reflection section 122 in the optical axis direction is shorter than the length of the light source lamp 11 so that the front sealing section 1121 of the light source lamp 11 protrudes from the light-irradiation opening of the ellipsoidal reflector 12 when the light source lamp 11 is fixed to the ellipsoidal reflector 12 as in the above.

According to the first exemplary embodiment, since the sub-reflection mirror 13 has four cutting portions 131A extending over the bonding portion of the sealing section 1121 of the light source lamp 11 by the adhesive 133, the size in the circumferential direction of the neck section 131 is changed by the four cutting portions 131A even when the light source lamp 11 is heated while the light source device 10 is driven and therefore the adhesive 133 thermally expands to cause stress in the direction to approach to the center axis of the insertion hole 131B and in the direction to recede away from the center axis of the insertion hole 131B. The stress by the adhesive 133 is thus reduced. Accordingly, even when the sub-reflection mirror 13 is bonded to the light source lamp 11 by the adhesive 133, the damage to the light source lamp 11 and the sub-reflection mirror 13 can be reduced or prevented, and the service life of the light source device 10 can be extended. Consequently, the service life of the projector 1 can be extended.

Since the sub-reflection mirror 13 has the neck section 131 and the reflection section 132, the bonding area of the sub-reflection mirror 13 for the light source lamp 11 is wider than the one without the neck section 131, thereby improving a bonding state between the light source lamp 11 and the sub-reflection mirror 13. As a result, the displacement of the sub-reflection mirror 13 can be properly reduced or prevented.

Since the neck section 131 is bonded to the sealing section 1121 and the four cutting portions 131A are formed at the neck section 131, no cutting portion is formed in the reflection section 132, that is, no cutting portion is formed in the reflection surface 132A. Therefore, the damage to the light source lamp 11 and the sub-reflection mirror 13 can be prevented, and the efficiency for the sub-reflection mirror 13 to use the light of the light source device 10 can be adequately maintained.

Since the sub-reflection mirror 13 has the four cutting portions 131A, the stress by the adhesive 133 is reduced more properly than the one having only one cutting portion 131A, thereby reducing or preventing the damage to the light source lamp 11 and the sub-reflection mirror 13. The four cutting portions 131A are symmetrically located with respect to an axis passing the center of the insertion hole 131B, the stress by the adhesive 133 can be dispersed, and therefore the damage to the light source lamp 11 and the sub-reflection mirror 13 can be efficiently reduced or prevented.

Since the projector has the light source device 10 capable of reducing or preventing the damage to the light source lamp 11 and the sub-reflection mirror 13, the replacement work of the light source device 10 required due to the damage of the light source lamp 11 and the sub-reflection mirror 13 can be reduced, thereby enhancing the convenience thereof.

2 Second Embodiment

A second exemplary embodiment of the present invention will be described with reference to the attached drawings.

In the following description, the components same as those in the first exemplary embodiment are indicated by the same reference symbols or numerals for omitting or simplifying the detailed description thereof.

In the first exemplary embodiment, the neck section 131 of the sub-reflection mirror 13 only has the cutting portions 131A.

In the second exemplary embodiment, on the other hand, a neck section 131 of a sub-reflection mirror 13A has openings 134 in addition to cutting portions 131A. The configuration other than the sub-reflection mirror 13A is the same as in the first exemplary embodiment.

FIGS. 6A and 6B are schematic illustrations each showing the sub-reflection mirror 13A according to the second exemplary embodiment. Specifically, FIG. 6A is a plan view of the sub-reflection mirror 13A seen from the upper side (wherein a lower side is defined as a side on which the weight of the light source device 10 is applied, and an upper side is defined as a side opposite to the side on which the weight is applied). FIG. 6B is a cross section taken along a line B-B in FIG. 6A.

As shown in FIG. 6A, each of the openings 134 formed at the neck section 131 of the sub-reflection mirror 13A is positioned at the base end side connected to a reflection section 132, and is formed substantially in a rectangular shape in plan view extending in the direction orthogonal to the cylindrical shaft direction of the neck section 131.

As shown in FIG. 6B, the openings 134 consist of two opposing openings 134A and 134B respectively formed on the upper side and the lower side of the neck section 131.

The opening 134 can be easily formed by rotating a not-show grinding tool such as a discoid grinding stone in the circumferential direction and contacting the neck section 131 on the grinding stone so that the cylindrical shaft direction of the neck section 131 is orthogonal to a plate surface of the grinding stone.

Figure 7:
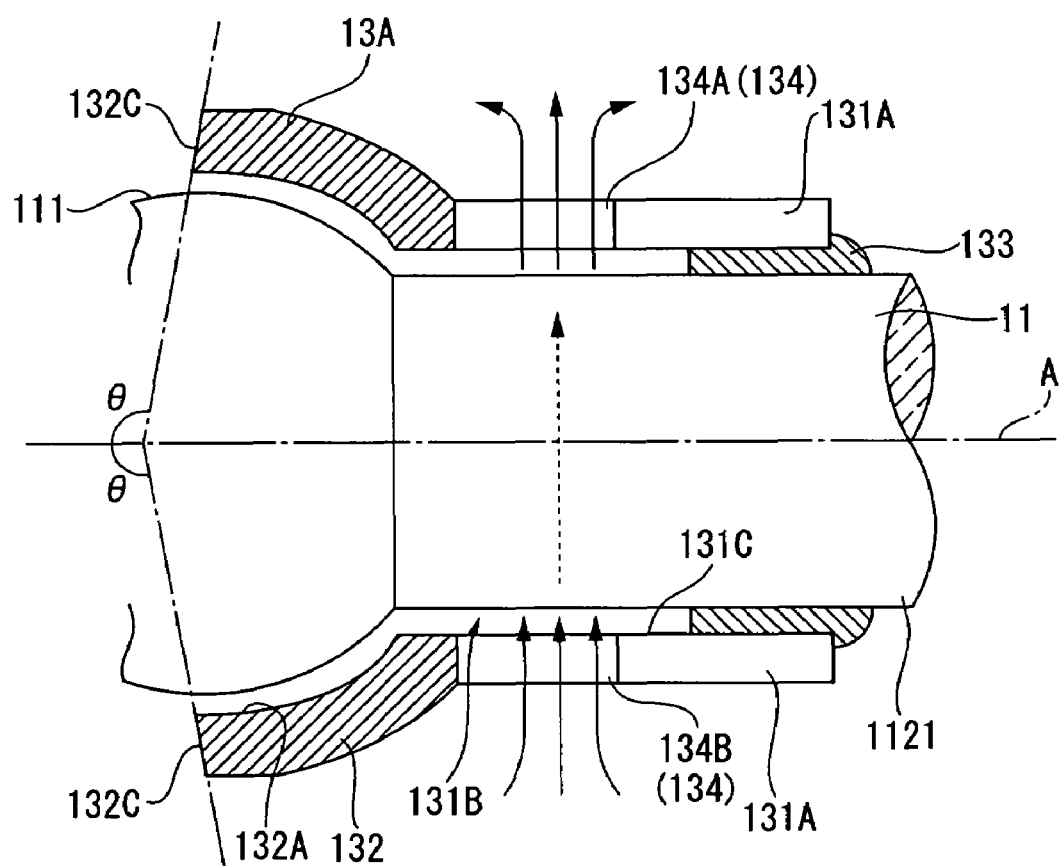
FIG. 7 is a schematic illustration showing a cooling mechanism by openings for a connecting portion between the light source lamp and the sub-reflection mirror according to the aforesaid exemplary embodiment.

In the second exemplary embodiment, two cutting portions 131A are formed on the upper side and the lower side of the neck section 131 corresponding to the above-described two openings 134 (see FIG. 7). The two cutting portions 131A are respectively connected to the two openings 134 as shown in FIG. 6A. The cutting portions 131A are connected to the approximate center portion in the extending direction (the vertical direction in FIG. 6A) in the openings 134. As shown in FIG. 6A, the width of the opening 134 in the extending direction (the vertical direction in FIG. 6A) is greater than the width of the cutting portion 131A.

Since a method for fixing the sub-reflection mirror 13A and the ellipsoidal reflector 12 to the light source lamp 11 is the same as the fixing method in the first exemplary embodiment, the description thereof will be omitted.

Next, a cooling mechanism by the above-described openings 134 for a connecting portion between the light source lamp 11 and the sub-reflection mirror 13A will be described.

FIG. 7 is an illustration showing the cooling mechanism by the openings 134 for the connecting portion between the light source lamp 11 and the sub-reflection mirror 13A. Specifically, FIG. 7 is a cross section of the light source lamp 11 and the sub-reflection mirror 13A seen from the lateral side.

When the light source lamp 11 emits light and the temperature thereof becomes high and thereby heating the air in a clearance between the light source lamp 11 and the sub-reflection mirror 13A, natural convection is caused between the clearance and the outside of the sub-reflection mirror 13A as shown in FIG. 7.

More specifically, as shown in FIG. 7, the heated air rises to the upper side along the clearance to be discharged to the outside of the sub-reflection mirror 13A through the opening 134A on the upper side. At the same time, the air outside the sub-reflection mirror 13A flows into the clearance through the opening 134B on the lower side.

The above-described natural convection inhibits the heated air from staying in the clearance, thereby suppressing the temperature rise of the connecting portion between the light source lamp 11 and the sub-reflection mirror 13A.

In the above-described second exemplary embodiment, comparing with the first exemplary embodiment, since the sub-reflection mirror 13A has the openings 134 at the neck section 131, the heat heated by the light source lamp 11 and staying in the clearance between the light source lamp 11 and the neck section 131 of the sub-reflection mirror 13A can be discharged to the outside of the sub-reflection mirror 13A through the opening 134. This suppresses the temperature rise of the connecting portion between the light source lamp 11 and the sub-reflection mirror 13A. Accordingly, the thermal expansion of the adhesive 133 is reduced, thereby reducing or preventing the damage to the light source lamp 11 and the sub-reflection mirror 13A.

Since the neck section 131 has the openings 134A and 134B respectively on both of the upper end and the lower end, the natural convection of the air between the clearance between the light source lamp 11 and the sub-reflection mirror 13A and the outside of the sub-reflection mirror 13A is easily caused. This suppresses the temperature rise of the connecting portion between the light source lamp 11 and the sub-reflection mirror 13A, and the thermal expansion of the adhesive 133 is thus reduced, thereby efficiently reducing or preventing the damage to the light source lamp 11 and the sub-reflection mirror 13A.

Since both of the cutting portions 131A and the openings 134 are formed at the neck section 131, the damage to the light source lamp 11 and the sub-reflection mirror 13A can be effectively reduced or prevented due to the effect of the cutting portions 131A for reducing the stress of the adhesive 133 in addition to the effect of the openings 134 for releasing the heat of the connecting portion between the light source lamp 11 and the sub-reflection mirror 13A.

Since the width of the opening 134 is greater than the width of the cutting portion 131A, and the opening 134 and the cutting portion 131A are connected with each other, the opening 134 as well as the cutting portion 131A serve to reduce the stress of the above-described adhesive 133. This allows larger size change of the neck section 131 in the circumferential direction, and therefore the damage to the light source lamp 11 and the sub-reflection mirror 13A can be effectively reduced or prevented even when the thermal expansion of the adhesive 133 is large.

While the present invention has been described above with the preferable exemplary embodiments, the present invention is not limited to the above-described exemplary embodiments, but includes improvements and modifications as long as an object of the present invention can be achieved.

In the respective exemplary embodiments, the shape and the number of the cutting portion formed in the sub-reflection mirror 13 is not limited as long as the cutting portion extends over the bonding portion between the light source lamp 11 and the sub-reflection mirror 13 in plan view.

For example, although the adhesive 133 is applied throughout the circumference of the sealing section 1121 so that the bonding portion formed by the adhesive 133 and the cutting portion 131A are in close contact in the respective exemplary embodiments, the adhesive 133 may be applied intermittently on the circumference of the sealing section 1121 so that the bonding portion formed by the adhesive 133 and the cutting portion 131A are spaced apart. In this case, the cutting portion 131A is so arranged to extend over the trajectory of the bonding portion drawn by the rotation when the bonding portion formed by the adhesive 133 is rotated around an axis passing the center of the insertion hole 131B.

The cutting portion 131A penetrates from the outer circumference to the inner circumference of the neck section 131 in the above description, it may be formed on either one of the inner circumference or the outer circumference without penetrating to the other.

In the sub-reflection mirror, for example, the cutting portion may be extended to the reflection section without limiting to the neck section.

Figure 8:
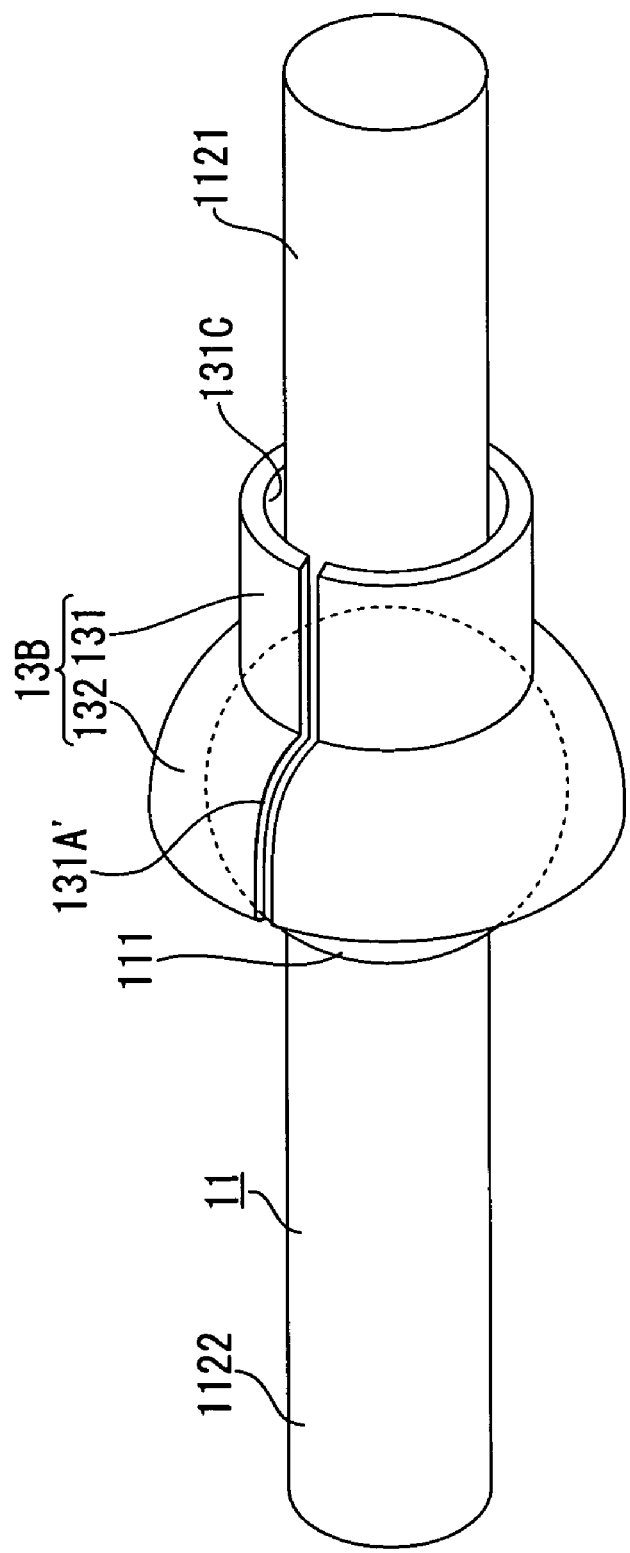
FIG. 8 is a schematic illustration showing a modification of the first exemplary embodiment.

Specifically, FIG. 8 is an illustration showing a modification of the formation position of the cutting portion in the first exemplary embodiment.

As shown in FIG. 8, in a sub-reflection mirror 13B, a cutting portion 131A' extends from the front end of a neck section 131 to a base end side connected to a reflection section 132, and further extends to a front end portion stretching from the neck section 131 in the reflection section 132. Namely, in the sub-reflection mirror 13B, the cutting portion 131A' is formed on both a neck section 131 and a reflection section 132 along the axial direction thereof.

An adhesion surface 131C of the neck section 131 and the outer circumference of the sealing section 1121 of the light source lamp 11 are bonded by the adhesive 133, so that the sub-reflection mirror 13B is attached to the light source lamp 11 in the same manner as the sub-reflection mirror 13 in the first exemplary embodiment.

The number of the cutting portion 131A' to be formed is not limited to one and may be two or more.

Figure 9:
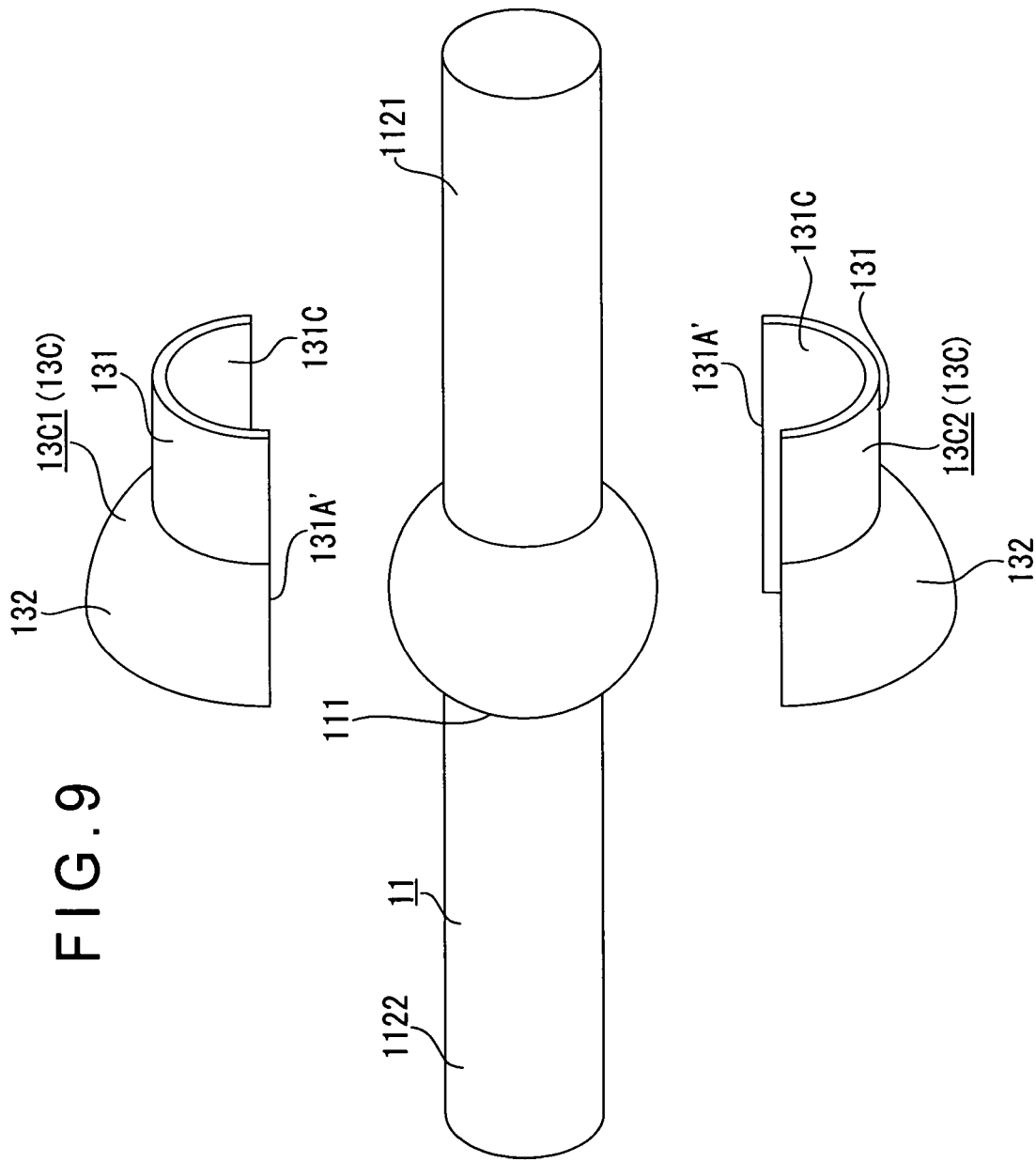
FIG. 9 is a schematic illustration showing another modification of the first exemplary embodiment.

Specifically, FIG. 9 is an illustration showing a modification of FIG. 8.

As shown in FIG. 9, a sub-reflection mirror 13C has two cutting portions 131A'. In other words, the sub-reflection mirror 13C is separated into a pair of a first sub-reflection mirror 13C1 and a second sub-reflection mirror 13C2 by two cutting portions 131A'.

The respective adhesion surfaces 131C of respective neck sections 131 and the outer circumference of the sealing section 1121 of the light source lamp 11 are bonded by the adhesive 133 so that the first sub-reflection mirror 13C1 and the second sub-reflection mirror 13C2 are combined, and thus the sub-reflection mirror 13C is attached to the light source lamp 11 in the same manner as the sub-reflection mirror 13 in the first exemplary embodiment.

The configurations shown in FIGS. 8 and 9 may be applied to the configuration having the opening 134 in the second exemplary embodiment without limiting to the first exemplary embodiment. In the case that the cutting portions 131A' is applied to the configuration having the openings 134, above-described cutting portions 131A' are so formed to be connected to respective opposing end sides of the openings 134.

In the first exemplary embodiment, the neck section 131 of the sub-reflection mirrors 13B and 13C in the configuration shown in FIGS. 8 and 9 may not be provided. In such case, the adhesive 133 is applied to the inner circumference of an opening portion having a small opening area in the reflection section 132 and the outer circumference of the sealing section 1121 of the light source lamp 11 for bonding them.

Although the above-mentioned cutting portions 131A and 131A' are formed along the extending direction of the sealing section 1121 of the light source lamp 11, they may be inclined with respect to the extending direction.

Although the opening 134 is formed in a rectangular shape in the second exemplary embodiment, it may be formed in other shapes.

For example, FIGS. 10A and 10B are illustrations each showing a modification of the opening of the second exemplary embodiment. Specifically, FIG. 10A is an illustration of a sub-reflection mirror 13D seen from the upper side. FIG. 10B is a cross section taken along a line B—B in FIG. 10A.

In the sub-reflection mirror 13D, each of openings 134' has a substantially circular shape as shown in FIG. 10A. Like the openings 134 of the second exemplary embodiment, the openings 134' consist of two opposing openings 134A' and 134B' respectively formed on the upper side and the lower side of a neck section 131.

The openings 134' can be easily formed by, for example, drilling from the upper side of the neck section 131 to the lower side thereof using a cutting tool such as a drill.

In the second exemplary embodiment, although the neck section 131 of the sub-reflection mirror 13A has both of the cutting portions 131A and openings 134, it may have only the openings 134.

For example, FIGS. 11A and 11B are illustrations each showing a modification of the second exemplary embodiment. Specifically, FIG. 11A is an illustration of a sub-reflection mirror 13E seen from the upper side. FIG. 11B is a cross section taken along a line B—B in FIG. 11A.

As shown in FIGS. 11A and 11B, the cutting portion 131A of the second exemplary embodiment is not formed at a neck section 131 of the sub-reflection mirror 13E, but only the openings 134 (134A and 134B) of the second exemplary embodiment are formed.

Even with such sub-reflection mirror 13E in which only the openings 134 are formed at the neck section 131, the natural convection can be caused between the clearance between the light source lamp 11 and the sub-reflection mirror 13E and the outside of the sub-reflection mirror 13E. This can suppress the temperature rise of the connecting portion between the light source lamp 11 and the sub-reflection mirror 13E, and thus the object of the present invention can be sufficiently achieved.

Although the sub-reflection mirror 13A shown in FIGS. 6A and 6B in the second exemplary embodiment has the openings 134A and 134B respectively formed on the upper end and the lower end of the neck section 131, it may have only the opening 134A on the upper end. Even with such configuration, the air in the clearance between the light source lamp 11 and the sub-reflection mirror 13A can be discharged to the outside of the sub-reflection mirror 13A through the opening 134A, thereby sufficiently achieving the object of the present invention. The same applies to the sub-reflection mirrors 13D and 13E shown in FIGS. 10A to 11B.

Although the sub-reflection mirror 13A shown in FIGS. 6A and 6B in the second exemplary embodiment has the openings 134A and 134B respectively formed on the upper end and the lower end of the neck section 131, it may have openings on other positions at the neck section 131 in addition to the openings 134A and the 134B. The same applies to the sub-reflection mirrors 13D and 13E shown in FIGS. 10A to 11B.

In the second exemplary embodiment, the temperature rise of the connecting portion between the light source lamp 11 and the sub-reflection mirror 13A is suppressed due to the natural convection. However, without limiting thereto, a cooling fan may be installed in the projector 1 so that the cooling air sent from the cooling fan flows into the light source device 10. The cooling air then flows in the clearance between the light source lamp 11 and the sub-reflection mirror 13A through the opening 134B, and flows from the clearance between the light source lamp 11 and the sub-reflection mirror 13A to the outside of the sub-reflection mirror 13A through the opening 134A. The same applies to the sub-reflection mirrors 13D and 13E shown in FIGS. 10A to 11B. According to such configuration, the air heated by the light source lamp 11 and staying in the clearance between the light source lamp 11 and the sub-reflection mirror 13A can be forcibly discharged to the outside of the sub-reflection mirror 13A. This suppresses the temperature rise of the connecting portion between the light source lamp 11 and the sub-reflection mirror 13A more effectively.

In the case that the forced cooling with use of the above-described cooling fan is performed, the position of the openings 134A and 134B to be formed is not limited to the position described in the second exemplary embodiment. Specifically, in the above-described configuration, in order to send the cooling air in the direction orthogonal to the paper in FIG. 6A, the openings 134A and 134B are formed on respective end positions (upper end position and lower end position) crossing with a flow path of the cooling air on the neck section 131. Alternatively, in order to send the cooling air in other directions, two openings are formed on respective end positions crossing with the flow path of the cooling air on the neck section 131. The same applies to the sub-reflection mirrors 13D and 13E shown in FIGS. 10A to 11B.

In the respective exemplary embodiments, the above-described cutting portion 131A and/or the opening 134 may be formed at the neck section 121 of the ellipsoidal reflector 12. In this case, a cutting portion and/or an opening to be formed at the neck section 121 may be the above-described cutting portion 131A and/or opening 134'.

Though the projector 1 using three liquid crystal panels 42R, 42G and 42B is taken as an example in the above exemplary embodiments, the present invention may be applied to a projector using a single liquid crystal panel, two liquid crystal panels or more than three liquid crystal panels.

Though the transmissive liquid crystal panel separately having a light-incident side and a light-irradiation side is used in the above exemplary embodiments, a reflective optical liquid crystal panel having common light-incident side and light-irradiation side may be used.

Though the liquid crystal panel is used as the optical modulator in the above exemplary embodiments, an optical modulator other than the liquid crystal panel such as a device using a micro-mirror may be used. In such case, the polarization plates at the light-incident side and the light-irradiation side can be omitted.

Though the front-type projector that projects an image in a direction from which a screen is observed taken as an example in the above exemplary embodiments, the present invention may be applied to a rear-type projector that projects an image in a direction opposite to the direction from which the screen is observed.

Though the light source device of the present invention is employed in a projector in the above exemplary embodiments, the light source device may be applied in other optical equipments.

Although the best configuration for implementing the present invention has been disclosed above, the present invention is not limited to thereto. In other words, the present invention is mainly illustrated and described on the specific exemplary embodiments, however, a person skilled in the art can modify the specific configuration such as shape, material, quantity in the above-described exemplary embodiment as long as a technical idea and an object of the present invention can be achieved.

Therefore, the description that limits the shape and the material is only the example to make the present invention easily understood, but does not intend to limit the present invention, so that the present invention includes the description using a name of component without a part of or all of the limitation on the shape and the material etc.

The priority applications No. JP2004-085042 and JP2004-125768 upon which this patent application is based are hereby incorporated by reference.

What is claimed is:

1. A light source device, comprising:
a light-emitting tube having a light-emitting portion that discharges electricity between electrodes and emits a light beam, and sealing sections provided on both ends of the light-emitting portion;
a reflector that aligns and irradiates the light beam radiated by the light-emitting tube in a predetermined direction; and
a sub-reflection mirror of which reflection surface opposes to a reflection surface of the reflector and reflects the light beam radiated by the light-emitting portion of the light-emitting tube toward the reflector,
the sub-reflection mirror has an insertion hole in which the sealing section is inserted and at least one cutting portion, an inner circumference of the insertion hole being bonded to the sealing section by an adhesive in a condition that the sealing section is inserted in the insertion hole; and
the at least one cutting portion and a portion bonded by the adhesive are at least partially overlapped.

2. The light source device according to claim 1, wherein the sub-reflection mirror comprises: a neck section having the insertion hole and extending along the sealing section; and a reflection section connected to a base end side in the extending direction of the neck section and having the reflection surface; and
the at least one cutting portion is formed on the neck section.

3. The light source device according to claim 2, wherein the cutting portion includes a plurality of cutting portions formed on the sub-reflection mirror; and
the plurality of cutting portions are symmetrically located with respect to an axis passing a center of the insertion hole.

4. The light source device according to claim 1, wherein the cutting portion includes a plurality of cutting portions formed on the sub-reflection mirror; and
the plurality of cutting portions are symmetrically located with respect to an axis passing a center of the insertion hole.

5. A projector, comprising:
a light source device according to claim 1;
an optical modulator that modulates a light beam irradiated by the light source device in accordance with image information; and
a projection optical device that enlarges and projects the light beam modulated by the optical modulator.

6. The projector according to claim 5, wherein
the sub-reflection mirror comprises: a neck section having the insertion hole and extending along the sealing section; and a reflection section connected to a base end side in the extending direction of the neck section and having the reflection surface; and
the at least one cutting portion is formed on the neck section.

7. The projector according to claim 6, wherein
the cutting portion includes a plurality of cutting portions formed on the sub-reflection mirror; and
the plurality of cutting portions are symmetrically located with respect to an axis passing a center of the insertion hole.

8. The projector according to claim 5, wherein
the cutting portion includes a plurality of cutting portions formed on the sub-reflection mirror; and
the plurality of cutting portions are symmetrically located with respect to an axis passing a center of the insertion hole.

9. A light source device, comprising:
a light-emitting tube having a light-emitting portion that discharges electricity between electrodes and emits a light beam, and sealing sections provided on both ends of the light-emitting portion;
a reflector that aligns and irradiates the light beam radiated by the light-emitting tube in a predetermined direction; and
a sub-reflection mirror of which reflection surface opposes to a reflection surface of the reflector and reflects the light beam radiated by the light-emitting portion of the light-emitting tube toward the reflector,
the sub-reflection mirror comprises: a neck section having an insertion hole in which the sealing section is inserted and of which inner circumference is bonded to the sealing section by an adhesive, the neck section extending along the sealing section; and a reflection section connected to a base end side in the extending direction of the neck section and having the reflection surface; and
at least one opening penetrating from an outer circumference of the neck section to the inner circumference of the insertion hole is formed on the neck section; and
the opening is closer to the base end side in the extending direction of the neck section than the portion bonded by the adhesive.

10. The light source device according to claim 9, wherein
when a lower side is defined as a side on which the weight of the light source device is applied, and an upper side is defined as a side opposite to the side on which the weight is applied,
the opening is formed on the upper side on the neck section.

11. The light source device according to claim 10, wherein the openings are formed on both of the upper side and the lower side on the neck section.

12. The light source device according to claim 10, wherein at least one cutting portion at least partially overlapping with the portion bonded by the adhesive is formed on the neck section.

13. The light source device according to claim 12, wherein
the width of the opening in a direction orthogonal to the extending direction of the neck section is greater than the width of the cutting portion in the direction orthogonal to the extending direction of the neck section; and
the opening and the cutting portion are connected with each other.

14. The light source device according to claim 9, wherein at least one cutting portion at least partially overlapping with the portion bonded by the adhesive is formed on the neck section.

15. A projector, comprising:
a light source device according to claim 9;
an optical modulator that modulates a light beam irradiated by the light source device in accordance with image information; and
a projection optical device that enlarges and projects the light beam modulated by the optical modulator.

16. The projector according to claim 15, wherein
when a lower side is defined as a side on which the weight of the light source device is applied, and an upper side is defined as a side opposite to the side on which the weight is applied,
the opening is formed on the upper side on the neck section.

17. The projector according to claim 16, wherein the openings are formed on both of the upper side and the lower side on the neck section.

18. The projector according to claim 16, wherein at least one cutting portion at least partially overlapping with the portion bonded by the adhesive is formed on the neck section.

19. The projector according to claim 18, wherein
the width of the opening in a direction orthogonal to the extending direction of the neck section is greater than the width of the cutting portion in the direction orthogonal to the extending direction of the neck section; and
the opening and the cutting portion are connected with each other.

20. The projector according to claim 15, wherein at least one cutting portion at least partially overlapping with the portion bonded by the adhesive is formed on the neck section.

* * * * *